United States Patent [19]

Honda et al.

[11] Patent Number: 4,715,247

[45] Date of Patent: Dec. 29, 1987

[54] TRANSMISSION APPARATUS WITH REDUCED FRICTIONAL FORCE

[75] Inventors: Toshio Honda; Toshiro Ohhashi; Yasuo Ohtsubo, all of Yokohama, Japan

[73] Assignees: Kabushiki Kaisha Toshiba, Kawasaki; Harmonic Drive Systems Inc., Tokyo, both of Japan

[21] Appl. No.: 911,450

[22] Filed: Sep. 25, 1986

[30] Foreign Application Priority Data

Sep. 26, 1985 [JP] Japan ................................. 60-211024
Sep. 26, 1985 [JP] Japan ................................. 60-211025

[51] Int. Cl.⁴ ..................... F16H 33/00; F16H 35/00; F16H 37/00
[52] U.S. Cl. ..................... 74/640; 384/523; 384/531; 384/533
[58] Field of Search ............ 74/640; 384/523, 528, 384/531, 533

[56] References Cited

U.S. PATENT DOCUMENTS

| | | | |
|---|---|---|---|
| 3,020,775 | 2/1962 | Musser | 74/440 |
| 3,285,099 | 11/1966 | Parks, Jr. et al. | 74/640 |
| 4,451,098 | 5/1984 | Farley et al. | 384/526 |
| 4,493,513 | 1/1985 | Osawa et al. | 384/523 X |

FOREIGN PATENT DOCUMENTS

| | | | |
|---|---|---|---|
| 2505155 | 8/1976 | Fed. Rep. of Germany | 74/640 |
| 36545 | 9/1972 | Japan | 384/533 |
| 100438 | 6/1916 | United Kingdom | 384/533 |
| 1104333 | 7/1984 | U.S.S.R. | 74/640 |

*Primary Examiner*—Leslie Braun
*Assistant Examiner*—Dirk Wright
*Attorney, Agent, or Firm*—Oblon, Fisher, Spivak, McClelland, & Maier

[57] ABSTRACT

This invention relates to reduction in frictional torque of a harmonic drive type transmission apparatus having a circular spline, a flexspline, and a wave generator. A wave generator bearing of the wave generator has a retainer for holding a number of balls which roll between the inner and outer races to be in contact with an inner race and an outer race and to be separated from each other in the circumferential direction. The ball retainer has a number of radial pockets for storing the balls. Each pocket is formed into a shape forming a narrow (in the circumferential direction) opening portion at the inner race side and a wide (in the circumferential direction) opening portion at the outer race side. The balls are in contact with the opening portion at the inner race side in the pockets at the minor axis positions of a drive cam, and the balls are in contact with substantially the central portion of the pocket inner surface at the major axis positions of the cam.

5 Claims, 11 Drawing Figures

TRANSMISSION APPARATUS WITH REDUCED FRICTIONAL FORCE

BACKGROUND OF THE INVENTION

1. Field of the Invention

The present invention relates to a flexible gear transmission mechanism and, more particularly, to a flexible gear transmission mechanism which reduces energy loss due to a frictional force.

2. Description of the Prior Art

A flexible gear mechanism comprising flexible gears is known, and is disclosed in U.S. Pat. No. 3,020,775 issued on Feb. 13, 1962, U.S. Pat. No. 3,285,099 issued on Nov. 15, 1966, U.S. Pat. No. 4,451,098 issued on May 29, 1984, and Japanese Patent Publication No. 47-36545.

A transmission apparatus using the flexible gear mechanism is commercially available as "Harmonic Drive" from Harmonic Drive Systems Inc. as one of the assignees of the present application. This apparatus is compact and lightweight and can obtain a high transmission ratio, and is applied to work machines such as a wheel drive apparatus, a machine tool, an industrial robot, a winch, and the like.

In the flexible gear mechanism, a wave generator has an elliptic cam, and a flexible ball-bearing like generator bearing arranged on the outer peripheral portion of the cam. Upon rotation of the elliptic cam, balls in the generator bearing are rotated to deform an outer race into a shape corresponding to the rotating position of the cam. A wavy motion is then generated along a flexspline, and shifts at the same speed as the rotating speed of the cam.

Balls must be arranged at equal intervals between inner and outer races of the generator bearing so as to transmit the motion of the cam to the outer race. For this purpose, a circular retainer having pockets for storing balls is provided between the inner and outer races of the generator bearing. Each pocket of the retainer is preferably formed to be sufficiently larger than the ball so as not to interfere with rotation of the ball.

However, although the inner and outer races of the generator bearing deform in an elliptical shape at the same speed as that of the cam, the retainer has a circular shape. For this reason, the inner peripheral surface of the retainer tends to be brought into contact with the inner race of the generator bearing at positions corresponding to the major axis positions of the cam. In particular, when the pockets of the retainer are formed to be sufficiently larger than the balls, such contact will occur over a wide range. Such contact causes energy loss by frictional torque, and the operation of the generator bearing may be interfered with by abrasion powder formed by contact.

SUMMARY OF THE INVENTION

It is therefore an object of the present invention to provide a flexible gear transmission apparatus which reduces a frictional torque by preventing a retainer from being in contact with an inner or outer race of a generator bearing.

It is another object of the present invention to prolong a service life of a wave generator by preventing generation of abrasion powder which interferes with the operation of a generator bearing.

It is still another object of the present invention to provide a flexible gear transmission apparatus in which retainer pockets do not interfere rotation of balls and the retainer can easily move as the balls move.

It is still another object of the present invention to provide a transmission apparatus which allows easy formation of pockets in a retainer.

According to the present invention, there is provided a transmission apparatus comprising a circular spline, a flexspline, and a wave generator and having an elliptic cam having an input shaft connected to the wave generator, and a wave generator bearing which is arranged around the cam and in which a plurality of balls are interposed between inner and outer races, wherein the wave generator bearing comprises a ring-like retainer having a plurality of pockets for holding the balls which roll between the inner and outer races to be in contact with the inner and outer races and to be separated from each other in a circumferential direction; each of the pockets of the retainer has a pocket inner surface forming a narrow opening portion at the inner race side and forming, at the outer race side, a wide opening portion having a larger size than the narrow opening portion at the inner race side; and the pocket inner surface has a first contour line curved in a plane perpendicular to an axis of the wave generator, whereby the balls at minor axis positions of the cam are in contact with the narrow opening portion of the pocket, and the balls at major axis positions of the cam are in contact with the pocket inner surface at a substantially central portion of the first contour line.

In addition, according to the present invention, there is provided a transmission apparatus wherein each pocket of the retainer has a pocket inner surface forming a narrow opening portion at the inner race side and forming, at the outer ring side, a wide opening portion having a larger size than the narrow opening portion at the inner race side; and the pocket inner surface is formed to be a curved surface surrounding a peripheral portion of the ball stored in each of the pocket, whereby the balls at minor axis positions of the cam are in contact with the narrow opening portions of the pockets, and the balls at major axis positions of the cam are in contact with a substantially central portion of the pocket inner surface in a ball moving direction.

With this transmission apparatus, at the major axis positions of a cam at which balls press a retainer in a circumferential direction with a largest force, a pressure per unit area which is received by a pocket inner surface of the retainer from the ball is reduced, and wear due to contact between the ball and the retainer can be decreased.

In addition, the pocket inner surface of the retainer of the transmission apparatus is formed in a curved surface surrounding a peripheral portion of a ball housed in a pocket, thus allowing easy and accurate formation of pockets.

DETAILED DESCRIPTION OF THE PREFERRED EMBODIMENTS

Figure 1:
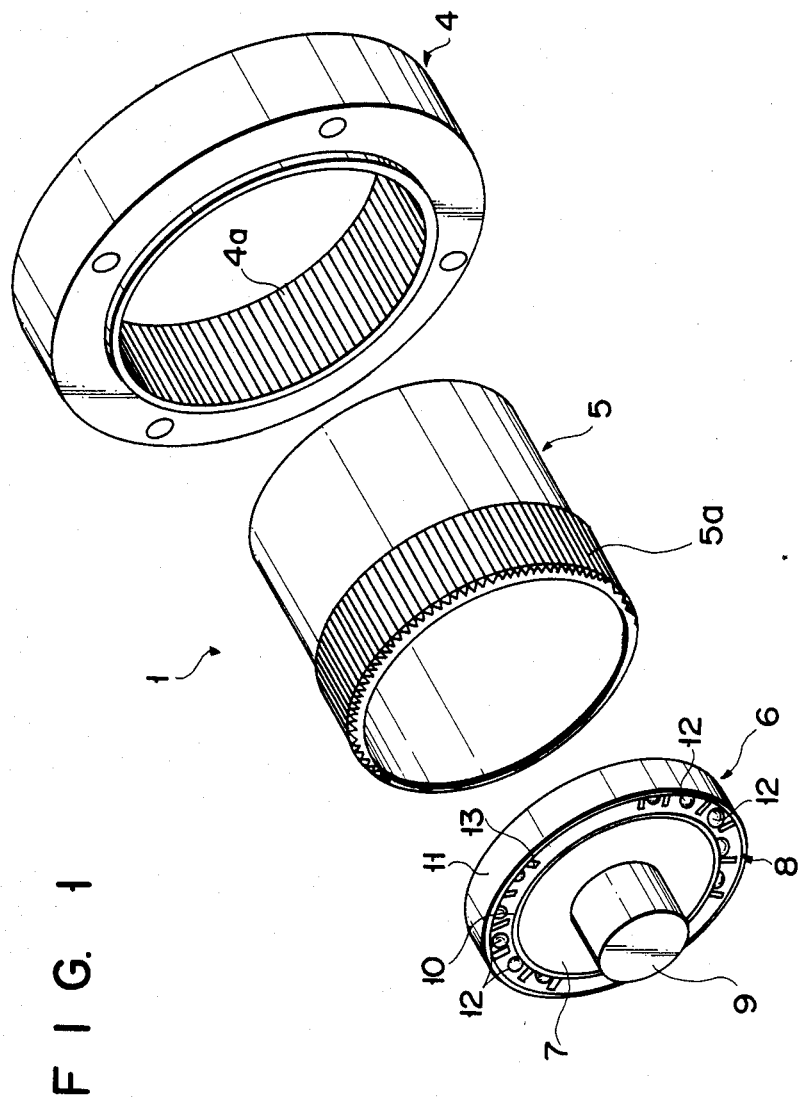
FIG. 1 is an exploded, a perspective view of the transmission apparatus according to one embodiment of the invention, showing a wave generator, a flexspline, and a circular spline.
Figure 2:
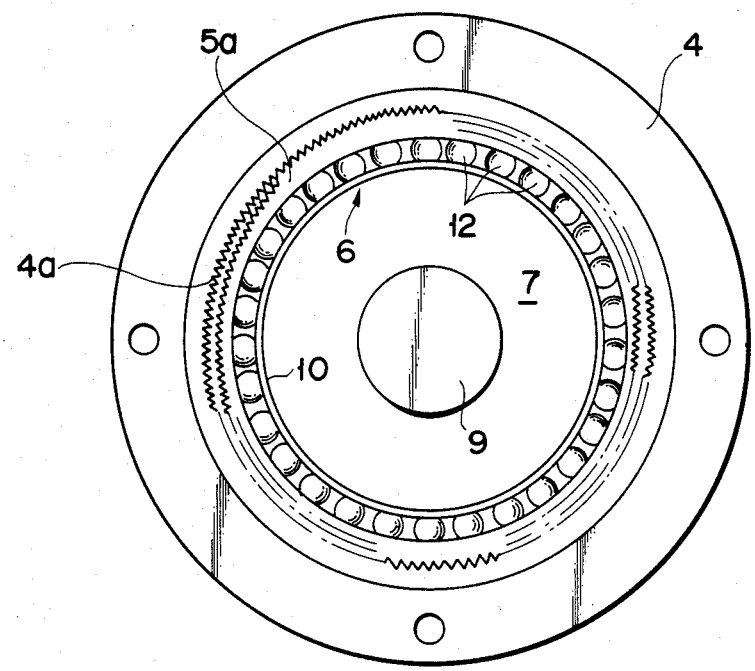
FIG. 2 is a front view showing the state wherein the components shown in FIG. 1 are assembled.
Figure 3:
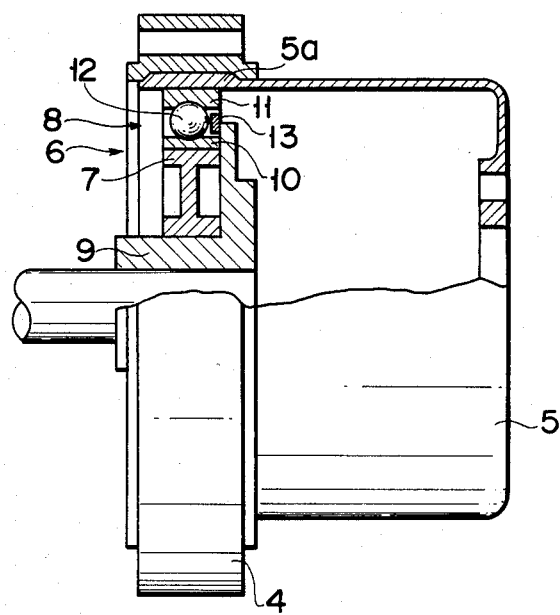
FIG. 3 is a sectional side view partially showing the transmission apparatus in FIG. 2.

As shown in FIGS. 1 to 3 in detail, harmonic drive type reduction-gear apparatus 1 comprises circular spline 4 with a rigid structure, flexspline 5 formed of a flexible elastic member, and wave generator 6. Involute spline 4a is formed on the inner perpheral surface of spline 4. Flexspline 5 is formed into a thin cup-like shape. Involute spline 5a is formed on the outer peripheral surface of the cup-shaped opening portion side of spline 5, and can be meshed with involute spline 4a of circular spline 4. The number of teeth of spline 5a is smaller than that of spline 4a by, e.g., 2. Wave generator 6 is arranged in flexspline 5.

Wave generator 6 has elliptic cam 7, and generator bearing 8 arranged on the outer peripheral portion of cam 7. Generator bearing 8 is formed to be a flexible ball bearing in which a plurality of balls 12 held by retainer 13 to be separated from each other are rotatably interposed between inner and outer rings 10 and 11. When elliptic cam 7 is rotated by drive source through input shaft 9, balls 12 are rotated along inner race 10, and wavy motion of flexspline 5 is generated through outer race 11, thereby sequentially moving the meshing positions between involute splines 4a and 5a corresponding to the major axis of cam 7.

In an embodiment of the invention wherein circular spline 4 is fixed, flexspline 5 moves in a direction opposite to the rotating direction of wave generator 6 by a difference between the number of teeth of involute splines 4a and 5a. Therefore, drive power of hydraulic motor is derived from flexspline 5 to a drive wheel.

In harmonic drive type transmission apparatus 1 of this embodiment, circular spline 4 is fixed in position. When wave generator 6, flexspline 5, and circular spline 4 are connected to an input or output side, a reduction ratio and a rotating direction can be desirably changed in accordance with applications.

Figure 4:
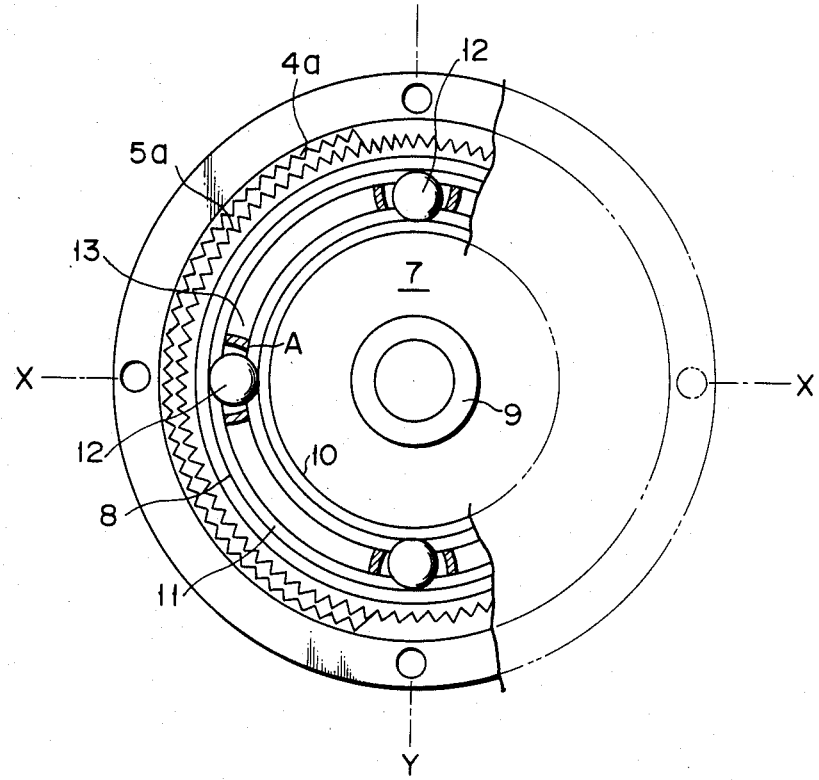
FIG. 4 is a front view showing a meshing state of the flexspline and the circular spline in accordance with the position of the wave generator.

FIG. 4 illustrates wave generator 8 in detail. Referring to FIG. 4, cam 7 has its minor axis along an X—X axis and its major axis along a Y—Y axis. Inner ring 10, formed of a flexible thin plate, of wave generator 8 is brought into tight contact with the outer peripheral surface of cam 7. Flexspline 5 is brought into tight contact with the outer peripheral portion of outer race 11 formed of a thin flexible plate. Involute splines 4a and 5a are meshed with each other at upper and lower portions in FIG. 4.

As can be seen from FIG. 4, in the present invention, retainer 13, which is arranged in a gap between inner and outer races 10 and 11 and holds balls 12 at positions separated from each other in the circumferential direction, is not in contact with inner or outer race 10 or 11.

Figure 5:
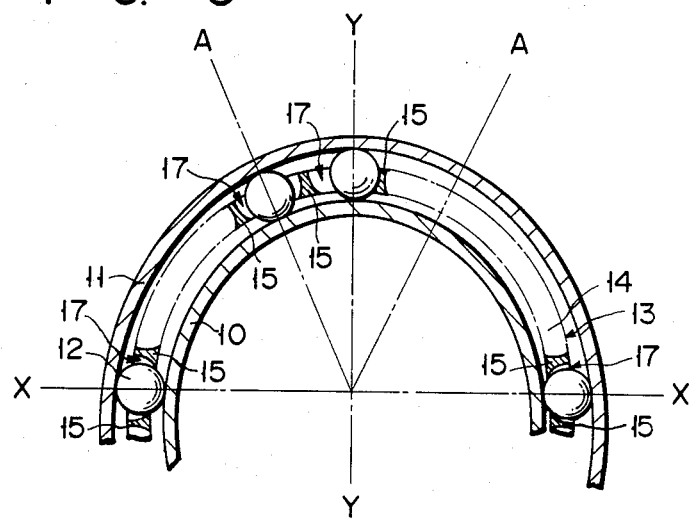
FIG. 5 is a front view showing the relationship between the wave and the generator bearing.

FIG. 5 illustrates generator bearing 8 in a state wherein the minor axis of cam 7 is arranged along the X—X axis and the major axis thereof is arranged along the Y—Y axis.

As shown in FIG. 5, retainer 13 has a circular shape, and is arranged in a gap between inner and outer races 10 and 11 which are deformed into an ellipse. Retainer 13 has circular body 14 and ball separating walls 15 projecting from one side of body 14 in its axial direction. Pocket 17 for rotatably storing ball 12 is defined between each two separating walls 15 adjacent in the circumferential direction. Retainer 13 is preferably formed of a rigid material with an excellent anti-wear property, more specifically, of a metal material.

Each pocket 17 defined between adjacent separating walls 15 and storing ball 12 is formed by one side of body 14 and holding surfaces 16 of opposite separating walls 15, and has a shape forming a narrow (in the circumferential direction) opening portion at the side of inner ring 10 and forming a wide (in the circumferential direction) opening portion at the side of outer ring 11. Therefore, the inner surface of pocket 17 is formed to be a spherically curved surface by holding surfaces 16.

Figure 6A:
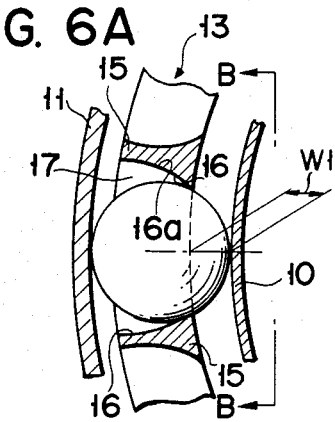
FIGS. 6A and 7A enlarged views showing states of a ball and a retainer respectively at the major and minor axis positions of a cam.
Figure 6B:
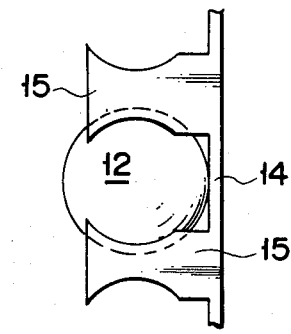
FIGS. 6B and 7B are sectional views taken along lines B—B in FIGS. 6A and 7A.
Figure 7A:
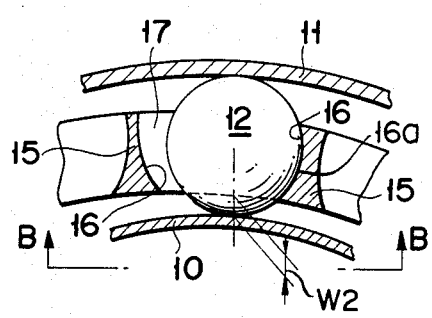
Figure 7B:
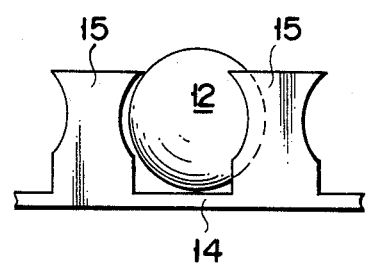

As shown in FIGS. 5, 6A, 6B, 7A, and 7B, holding surfaces 16 defining the wall surface of pocket 17 are formed to be curved surfaces. Curved surface 16 preferably has first contour line 16a having the same radius of curvature as that of a great circle of ball 12 on the plane perpendicular to the rotating axis of ball 12, i.e., on the plane perpendicular to the axis of generator bearing 8. More preferably, curved surface 16 has second contour line 16b which is curved on the plane substantially perpendicular to first contour line 16a. As shown in FIG. 7A, holding surfaces 16 coincide with and are brought into contact with ball 12 at the major axis position of cam 7. That is, a substantially central portion of the pocket inner surface and of first contour line 16a, (i.e., substantially midway between the inner and outer ring edges of the holding surfaces) is engaged by the ball 12 at the major axis position.

The opening portion at the side of inner ring 10 formed at the edge portions of two holding surfaces 16 adjacent in the circumferential direction is smaller in size in the circumferential direction than the diameter of ball 12. This opening portion is in contact with ball 12 at the minor axis position of cam 7, i.e., at the position of the X—X axis in FIG. 5, thereby preventing retainer 13 from moving in the direction of outer race 11, as shown in FIGS. 6A and 6B. The opening portion formed at the edge portions at the side of outer race 11 is larger in size than the diameter of ball 12. Therefore, ball 12 is not restricted by the opening portion at the side of inner race 10 excluding a position around the minor axis position to be freely rotated in pocket 17.

Figure 8:
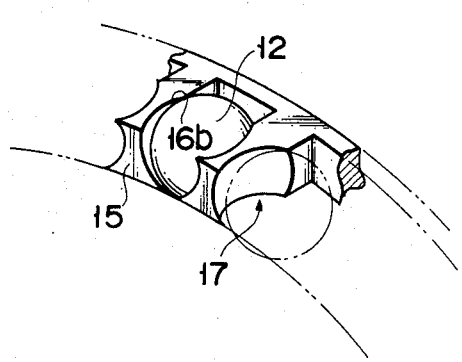
FIG. 8 is a perspective view showing the shape of a pocket of the retainer shown in FIGS. 6A to 7B.

FIG. 8 shows the shape of pocket 17 having three openings.

Figure 9:
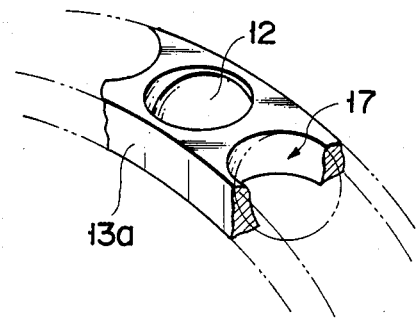
FIG. 9 is a perspective view showing the shape of a pocket of a retainer in a transmission apparatus according to another embodiment of the present invention.

FIG. 9 shows retainer 13a which has a coffee cup-like pocket shape and two openings at the inner and outer ring sides.

The operation of retainer 13 will be described.

When cam 7 of wave generator 6 is rotated, balls 12 are pressed and rotated by inner and outer races 10 and 11 in two regions within a predetermined range indicated by A—A' in FIG. 5 having the major axis position indicated by the Y—Y axis as the center, and are in a free moving state in other regions.

As shown in FIG. 5, retainer 13 shaped like a ring and has pockets 17 arranged at equal intervals. As cam 7 rotates, retainer 13 moves along inner race 10, and balls 12 roll on this race. While retainer 13 and balls 12 are moving in this manner, the gap between inner race 10 and retainer 13 gradually decreases from either minor axis position toward either major axis position. FIG. 6A shows wide gap W1 between inner race 10 and that portion of retainer 13 which is located at one minor axis position. FIG. 7A represents narrow gap W2 between inner race 10 and that portion of retainer 13 which is located at the major axis position. When holding surfaces 16 of separating walls 15 defining pocket 17 abut against ball 12 moving in the circumferential direction, retainer 13 is rotated in the circumferential direction together with balls 12, thereby constantly holding balls 12 at predetermined intervals.

At the minor axis positions of cam 7, i.e., two end positions of the X—X axis in FIG. 5, balls 12 abut against the opening portions, at the side of inner ring 10, of pockets 17 and press the two sides of retainer 13 toward inner ring 10. In other words, retainer 13 can be held in a gap between inner and outer races 10 and 11 only by balls 12 at the minor axis positions. Therefore, the outer peripheral portion of retainer 13 which is closest to outer race 11 is not in contact with outer race 11, and the inner peripheral portion of retainer 13 which is closest to inner race 10 is not in contact with inner race 10. Thus, a frictional torque due to contact between retainer 13 and inner or outer race 10 or 11 will not be generated. Since retainer 13 is not in contact with inner and outer races 10 and 11, abrasion powder is not formed, thus prolonging the service life of wave generator 6.

In the predetermined range of A—A' in FIG. 5 in which balls 12 are pressed by inner and outer races 10 and 11, balls 12 are rotated to be in contact with one of holding surfaces 16 defining each pocket 17.

Each holding surface 16 is formed into a curved surface, and has the same radius of curvature as that of ball 12 on the plane perpendicular to the rotating axis of ball 12. Therefore, when ball 12 abuts against holding surface 16, it applies a rotating force only in the tangential direction on retainer 13, and does not apply a radial force. For this reason, rotation of balls 12 is not interfered with, and no energy is wasted. This also makes the holding operation of retainer 13 at the minor axis positions more effective.

The present invention has been described with reference to the preferred embodiments. However, various changes and modifications may be made within the spirit and scope of the invention.

What is claimed is:

1. A transmission apparatus comprising a circular spline, a flexspline, and a wave generator and having an elliptic cam having major and minor axes and an input shaft connected to said wave generator, and a wave generator bearing which is arranged around said cam and in which a plurality of balls are interposed between inner and outer races, wherein said wave generator bearing comprises a ring-shaped retainer having a plurality of pockets for holding said balls which roll between said inner and outer races to be in contact with said inner and outer races and to be separated from each other in a circumferential direction;

each of said pockets of said retainer has a pocket inner surface forming a narrow opening portion at the inner race side and forming, at the outer race side, a wide opening portion having a larger size than said narrow opening portion at the inner race side; and said pocket inner surface has a first contour line curved in a palne perpendicular to an axis of said wave generator, whereby the balls at minor axis positons of said cam are in contact with the narrow opening portion of said pocket, and the surface of the balls at major axis positions of asid cam engage the pocket inner surface in an area containing a substantially central portion of said first contour line, said substantially central portion being substantially midway between said wide opening portion and said narrow opening portion.

2. An apparatus according to claim 1, wherein said first contour line of said pocket inner surface is formed into a shape which substantially coincides with the shape of the ball in contact with said pocket inner surface at the major axis position of said cam.

3. An apparatus according to claim 1, wherein said pocket inner surface has a second contour line curved in a plane substantially perpendicular to said first contour line.

4. A transmission apparatus comprising a circular spline, a flexspline, and a wave generator and having an elliptic cam having major and minor axes and an input shaft connected to said wave generator, and a wave generator bearing which is arranged around said cam and in which a plurality of balls are interposed between inner and outer races, wherein said wave generator bearing comprises a ring-shaped retainer having a plurality of pockets for holding said balls which are incontact with said inner and outer races to be rotated and moved between said inner and outer races to be separated in a circumferential direction;

each of said pockets of said retainer has a pocket inner surface forming a narrow opening portion at the inner ring side and forming, at the outer ring side, a wide opening portion having a larger size than said narrow opening portion at the inner race side; and said pocket inner surface is formed to be a curved surface surrounding a peripheral portion of the ball stored in each of said pockets, whereby the balls at minor axis positions of said cam are in contact with the narrow opening portions of said pockets, and the surface of the balls at major axis positions of said cam engage a substantially central portion of said pocket inner surface in a ball moving direction, said substantially central portion being substantially midway between said wide opening portion and said narrow opening portion.

5. An apparatus according to claim 4, wherein said pocket inner surface of said retainer is formed into a shape which substantially coincides with the shape of the ball in contact with said pocket inner surface at the major axis position of said cam.

* * * * *